United States Patent
Liu et al.

(10) Patent No.: US 9,637,586 B2
(45) Date of Patent: May 2, 2017

(54) HIGH TEMPERATURE RESISTANT EPOXY RESINS FOR PRODUCING HOLLOW FIBER MEMBRANE MODULES FOR HIGH TEMPERATURE GAS SEPARATION APPLICATIONS

(71) Applicant: UOP LLC, Des Plaines, IL (US)

(72) Inventors: Chunqing Liu, Arlington Heights, IL (US); Howie Q. Tran, Skokie, IL (US); Travis C. Bowen, Crystal Lake, IL (US)

(73) Assignee: UOP LLC, Des Plaines, IL (US)

( * ) Notice: Subject to any disclaimer, the term of this patent is extended or adjusted under 35 U.S.C. 154(b) by 290 days.

(21) Appl. No.: 14/620,780

(22) Filed: Feb. 12, 2015

(65) Prior Publication Data
US 2016/0236151 A1    Aug. 18, 2016

(51) Int. Cl.
*B01D 53/22* (2006.01)
*C08G 59/02* (2006.01)
*C08G 59/50* (2006.01)
*B01D 63/02* (2006.01)

(52) U.S. Cl.
CPC ........... *C08G 59/02* (2013.01); *B01D 53/228* (2013.01); *B01D 63/023* (2013.01); *C08G 59/5033* (2013.01); *B01D 2053/224* (2013.01)

(58) Field of Classification Search
CPC .. C08G 59/5033; C08G 59/02; B01D 63/023; B01D 53/228; B01D 2053/224
See application file for complete search history.

(56) References Cited

U.S. PATENT DOCUMENTS

| | | | | |
|---|---|---|---|---|
| 4,183,890 A * | 1/1980 | Bollinger | ............. | B01D 63/023 156/296 |
| 4,248,998 A * | 2/1981 | Udovich | ............. | C07D 303/40 528/176 |
| 4,386,191 A * | 5/1983 | DiSalvo | ............. | C08G 18/58 525/504 |
| 6,379,799 B1 * | 4/2002 | Almen | ............. | C08G 59/3218 428/297.4 |
| 6,410,127 B1 * | 6/2002 | Kamae | ............. | C08G 59/18 428/297.4 |
| 7,867,319 B2 | 1/2011 | Zaki et al. | | |
| 8,388,733 B2 | 3/2013 | Yamaoka et al. | | |
| 2003/0116347 A1 * | 6/2003 | Kubo | ............. | C08G 59/5033 174/260 |
| 2004/0242836 A1 * | 12/2004 | Hayes | ............. | C08G 59/5033 528/124 |
| 2006/0217499 A1 * | 9/2006 | Takenaka | ............. | C08G 59/188 525/533 |
| 2007/0196612 A1 * | 8/2007 | Igarashi | ............. | C08G 59/5033 428/41.3 |
| 2008/0081170 A1 * | 4/2008 | Tilbrook | ............. | C08G 59/38 428/292.1 |
| 2010/0279469 A1 * | 11/2010 | Jin | ............. | C08G 59/4253 438/113 |
| 2011/0097568 A1 * | 4/2011 | Kamae | ............. | C08G 59/3209 428/222 |
| 2011/0259514 A1 * | 10/2011 | Boyle | ............. | C08G 59/184 156/276 |
| 2013/0012620 A1 * | 1/2013 | Dershem | ............. | C07D 233/61 523/400 |
| 2014/0057515 A1 * | 2/2014 | Suzuki | ............. | C08J 5/24 442/65 |
| 2014/0162072 A1 * | 6/2014 | Suzuki | ............. | C08L 63/00 428/418 |
| 2015/0299378 A1 * | 10/2015 | Chen | ............. | C08G 59/5033 523/400 |
| 2016/0152785 A1 * | 6/2016 | Ueno | ............. | C08J 5/24 523/468 |
| 2016/0264718 A1 * | 9/2016 | Qin | ............. | C07C 317/32 |
| 2016/0297951 A1 * | 10/2016 | Kumano | ............. | C08L 47/00 |
| 2017/0009022 A1 * | 1/2017 | Kondo | ............. | C08G 77/48 |

* cited by examiner

Primary Examiner — Anthony Shumate

(57) ABSTRACT

The present invention provided a high temperature resistant epoxy resins for producing hollow fiber membrane modules for high temperature gas separation applications such as for natural gas upgrading and hydrogen purifications. This invention also relates to a hollow fiber membrane module comprising a bundle of multiple high performance hollow fiber membranes and a tube sheet formed by a high temperature resistant cured epoxy resin that is used to fix and bound said bundle of multiple high performance hollow fiber membranes. The invention also provides a process for separating at least one gas from a mixture of gases using the hollow fiber membrane modules comprising a bundle of multiple high performance hollow fiber membranes and a tube sheet formed by a high temperature resistant cured epoxy resin that is used to fix and bound said bundle of multiple high performance hollow fiber membranes.

17 Claims, No Drawings

HIGH TEMPERATURE RESISTANT EPOXY RESINS FOR PRODUCING HOLLOW FIBER MEMBRANE MODULES FOR HIGH TEMPERATURE GAS SEPARATION APPLICATIONS

BACKGROUND OF THE INVENTION

This invention relates to high temperature resistant epoxy resins for producing hollow fiber membrane modules for high temperature gas separation applications. This invention also relates to a hollow fiber membrane module comprising a high temperature resistant cured epoxy resin tube sheet.

In the past 30-35 years, the state of the art of polymer membrane-based gas separation processes has evolved rapidly. Membrane-based technologies have advantages of both low capital cost and high-energy efficiency compared to conventional separation methods. Membrane gas separation is of special interest to petroleum producers and refiners, chemical companies, and industrial gas suppliers. Several applications of membrane gas separation have achieved commercial success, including $N_2$ enrichment from air, carbon dioxide removal from natural gas and from enhanced oil recovery, and also in hydrogen removal from nitrogen, methane, and argon in ammonia purge gas streams. For example, UOP's Separex™ polymeric membrane is currently an international market leader for carbon dioxide removal from natural gas.

The polymeric membranes most commonly used in commercial gas separation applications are flat sheet or hollow fiber membranes that can be fabricated into spiral wound or hollow fiber membrane modules. The flat sheet or hollow fiber membranes have a thin nonporous selective skin layer that performs the separation and a highly porous non-selective mechanical support layer. Separation is based on a solution-diffusion mechanism. This mechanism involves molecular-scale interactions of the permeating gas with the membrane polymer. The mechanism assumes that in a membrane having two opposing surfaces, each component is sorbed by the membrane at one surface, transported by a gas concentration gradient, and desorbed at the opposing surface. Each spiral wound or hollow fiber membrane module comprises multiple flat sheet or hollow fiber membranes bound together with a cured epoxy resin that is essentially impermeable to the gas pairs to be separated.

UOP Separex™ commercial spiral wound membranes for natural gas upgrading comprise flat sheet membranes made by a phase inversion technique. The Separex™ spiral wound membrane module has the key features of cross-flow, high pressure tolerance, high fouling resistance, high reliability, and ease of installation into space-efficient, skid-mounted units. Some commercial gas separation membranes have hollow fiber configuration and are formed into hollow fiber modules. Hollow fiber membrane modules with much higher membrane area packing density than spiral wound modules have been commercially used for both low pressure and high pressure applications. The key features of hollow fiber modules for high pressure gas separations such as $CO_2/CH_4$ separation and $H_2$ purification include cross-flow and good feed flow distribution. The key features of hollow fiber modules for low pressure gas separations, such as On Board Inert Gas Generating Systems (OBIGGS) application and dehydration of air include counter-flow and low fouling.

The state-of-the-art hollow fiber membrane spinning processes allow multiple parallel spinning lines for high throughput, low cost fabrication. The hollow fiber membrane module having a feed gas inlet, a residue outlet, and a permeate outlet comprises a bundle of hollow fiber membranes, wherein one end or both ends of the membrane bundle is fixed and bound together in what is commonly referred to as a tube sheet formed of a cured epoxy resin. The tube sheet is impermeable to the gases and fixes and holds the hollow fibers in a gas-tight relationship. The tube sheet seals between the hollow fibers and between the fibers and the module shell, so that the permeate flow is separated from the feed and residue flows. The hollow fiber membrane modules will lose the separation property if the cured epoxy resin of the tube sheet cracks or decomposes.

Hollow fiber membrane modules have been commercially used for the separation of clean gas streams such as separation of nitrogen or water from air and purification of hydrogen from ammonia purge gas or syngas. However, most of the hollow fiber membrane modules for gas separation applications cannot be operated at temperatures above 80° C. due to the use of the tube sheet formed from low temperature stable cured epoxy resin and the use of low temperature stable packaging material. The low temperature stable cured epoxy resin is typically formed from a low temperature stable epoxy resin and a low temperature stable aliphatic diamine with the advantages of low cost, low viscosity, easy to mix, fast reaction, and room temperature-curing. However, this type of cured epoxy resin with cured network can work up to 80° C., but not above.

Zaki et al. (U.S. Pat. No. 7,867,319) disclosed a filled epoxy tubesheet comprises an epoxy filled with a metal.

Yamaoka et al. (U.S. Pat. No. 8,388,733) disclosed an epoxy resin composition for producing hollow fiber membrane elements that can be operated above 80° C.

It is desirable to develop high temperature resistant epoxy resin for producing hollow fiber membrane modules that can be operated above 100° C. for gas separation applications such as for $H_2$ purifications.

SUMMARY OF THE INVENTION

This invention pertains to high temperature resistant epoxy resins for producing hollow fiber membrane modules for high temperature gas separation applications such as for natural gas upgrading and hydrogen purifications. This invention also relates to a hollow fiber membrane module comprising a high temperature resistant cured epoxy resin tube sheet.

The invention also provides a process for separating at least one gas from a mixture of gases using the hollow fiber membrane modules comprising a bundle of multiple high performance hollow fiber membranes and a tube sheet formed by a high temperature resistant cured epoxy resin that is used to fix and bound said bundle of multiple high performance hollow fiber membranes, the process comprising: (a) providing a hollow fiber membrane module described in the present invention comprising a bundle of multiple high performance hollow fiber membranes which are permeable to said at least one gas and a tube sheet formed by a high temperature resistant cured epoxy resin that is used to fix and bound said bundle of multiple high performance hollow fiber membranes; (b) contacting the mixture on one side of said hollow fiber membrane module to cause said at least one gas to permeate said hollow fiber membranes; and (c) removing from the opposite side of said hollow fiber membrane module a permeate gas composition comprising a portion of said at least one gas which permeated said hollow fiber membranes.

The hollow fiber membrane module described in the current invention comprising a bundle of multiple high performance hollow fiber membranes and a tube sheet formed by a high temperature resistant cured epoxy resin that is used to fix and bound said bundle of multiple high performance hollow fiber membranes is not only suitable for $CO_2/CH_4$ separation, but also suitable for a variety of other gas separations such as $H_2$ purification, $O_2/N_2$ and $H_2S/CH_4$ separations.

DETAILED DESCRIPTION OF THE INVENTION

The use of membranes for separation of both gases and liquids is a growing technological area with potentially high economic reward due to the low energy requirements and the potential for scaling up of modular membrane designs. Advances in membrane technology, with the continuing development of new membrane materials and new methods for the production of high performance membranes and membrane modules will make this technology even more competitive than traditional, high-energy intensive and costly processes such as distillation. Among the applications for large scale gas separation membrane systems are nitrogen enrichment, oxygen enrichment, hydrogen recovery, removal of hydrogen sulfide and carbon dioxide from natural gas and dehydration of air and natural gas. Also, various hydrocarbon separations are potential applications for the appropriate membrane system. The membranes that are used in these applications must have high selectivity, durability, and productivity in processing large volumes of gas or liquid in order to be economically successful. In addition, the membrane modules particularly the tube sheet and the packaging materials inside the modules that are used in these applications must have good temperature resistance and high hydrocarbon and contaminant resistance.

Hollow fiber membrane modules have been commercially used for the separation of clean gas streams such as separation of nitrogen or water from air and purification of hydrogen from ammonia purge gas or syngas. However, most of the hollow fiber membrane modules for gas separation applications cannot be operated at temperatures above 80° C. due to the use of the tube sheet formed from low temperature stable cured epoxy resin and the use of low temperature stable packaging material. The low temperature stable cured epoxy resin is typically formed from a low temperature stable epoxy resin and a low temperature stable aliphatic diamine with the advantages of low cost, low viscosity, easy to mix, fast reaction, and room temperature-curing. However, this type of cured epoxy resin with cured network can work up to 80° C., but not above.

The present invention provides high temperature resistant, high hydrocarbon and high contaminant resistant epoxy resins for producing hollow fiber membrane modules. This invention also relates to a hollow fiber membrane module comprising a bundle of multiple high performance hollow fiber membranes and a tube sheet formed by a high temperature resistant cured epoxy resin that is used to fix and bound said bundle of multiple high performance hollow fiber membranes. This invention also pertains to the application of said hollow fiber membrane modules comprising a bundle of multiple high performance hollow fiber membranes and a tube sheet formed by a high temperature resistant cured epoxy resin that is used to fix and bound said bundle of multiple high performance hollow fiber membranes for $H_2$ purifications such as $H_2/CH_4$ separation, and also for a variety of other gas separations such as separations of $CO_2/CH_4$, $H_2S/CH_4$, $CO_2/N_2$, olefin/paraffin (e.g. propylene/propane), and $O_2/N_2$ separations.

The hollow fiber membrane module for gas separations having a feed gas inlet, a residue outlet, and a permeate outlet comprises a bundle of hollow fiber membranes, wherein one end or both ends of the membrane bundle is fixed and bound together in what is commonly referred to as a tube sheet formed of a cured epoxy resin. The present invention provides a high temperature resistant epoxy resin for producing such a tube sheet in the hollow fiber membrane module for high temperature gas separation applications, wherein the high temperature resistant epoxy resin comprises an aromatic epoxy, a diluent, and an aromatic diamine, wherein said aromatic epoxy is represented by formula (I):

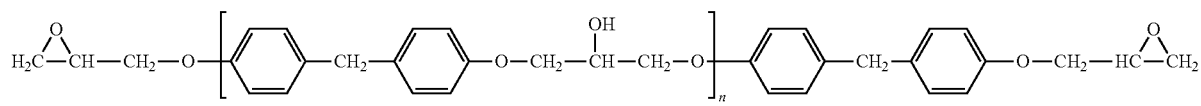

wherein n is a positive integer from 1 to 10;
wherein said diluent is selected from the group consisting of an epoxy represented by formula (II), an epoxy represented by formula (III), and a mixture thereof;

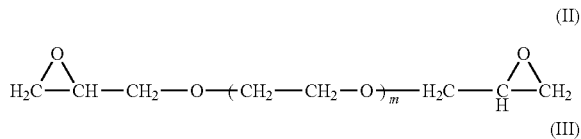

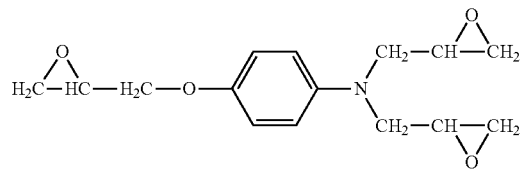

wherein m is a positive integer from 2 to 10;
wherein said aromatic diamine is represented by formula (IV):

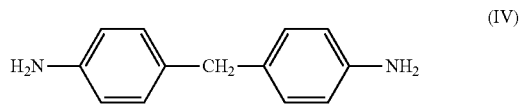

wherein the weight ratio of said aromatic epoxy to said diluent is in a range of 10:1 to 35:1.
Preferably the weight ratio of said aromatic epoxy to said diluent is in a range of 15:1 to 25:1. wherein the weight ratio of said aromatic epoxy to said aromatic diamine is in a range of 3:1 to 15:1. Preferably the weight ratio of said aromatic epoxy to said aromatic diamine is in a range of 4:1 to 10:1.

In the present invention, the high temperature resistant epoxy resin is cured to form the tube sheet in the hollow fiber membrane module, wherein one end or both ends of the hollow fiber membrane bundle is fixed and bound together in the tube sheet formed of the cured high temperature resistant epoxy resin described in the current invention. The cured high temperature resistant epoxy resin described in the current invention is impermeable to the gases and fixes and holds the hollow fibers in a gas-tight relationship. The tube sheet formed of the cured high temperature resistant epoxy resin described in the current invention seals between the hollow fibers and between the fibers and the module shell, so that the permeate flow is separated from the feed and residue flows. The hollow fiber membrane module comprising the tube sheet formed of the cured high temperature resistant epoxy resin described in the current invention maintains the separation property without cracking and decomposition of the cured epoxy resin up to at least 150° C. gas separation operating temperature.

For the preparation of the tube sheet formed of cured high temperature resistant epoxy resin described in the current invention, a hollow fiber membrane bundle is formed by the method as disclosed in the literature (for example, see U.S. Pat. No. 7867319). The hollow fiber membrane bundle is installed at a predetermined position in a mold. A predetermined amount of the high temperature resistant epoxy resin composition described in the present invention including the aromatic epoxy, the diluent, and the aromatic diamine is mixed under high speed stirring for at least 4 hours to form a homogeneous viscous liquid at room temperature. The homogeneous viscous liquid is then injected into the mold containing the hollow fiber membrane bundle to form the tube sheet. The homogeneous viscous liquid of the high temperature resistant epoxy resin described in the current invention inside the mold is cured at a temperature in a range of 50° to 250° C. to form the tube sheet. Preferably the high temperature resistant epoxy resin described in the current invention inside the mold is cured at a lower temperature in a range of 50° to 100° C. first and then at a higher temperature in a range of 100° to 250° C. to form the tube sheet.

The hollow fiber membranes used for the preparation of the hollow fiber membrane module comprising a bundle of multiple high performance hollow fiber membranes and a tube sheet formed by a high temperature resistant cured epoxy resin that is used to fix and bound said bundle of multiple high performance hollow fiber membranes in the present invention can be prepared from a polymer selected from a group consisting of polyimides, polyetherimides, polyamides, polysulfones, polyethersulfones, cellulosic polymers such as cellulose acetate and cellulose triacetate, polyamide/imides, polyketones, polyether ketones, polymers with intrinsic microporosity, polybenzoxazoles, polybenzixazoles, and mixtures thereof.

The invention also provides a process for separating at least one gas from a mixture of gases using the hollow fiber membrane modules comprising a bundle of multiple high performance hollow fiber membranes and a tube sheet formed by a high temperature resistant cured epoxy resin that is used to fix and bound said bundle of multiple high performance hollow fiber membranes, the process comprising: (a) providing a hollow fiber membrane module described in the present invention comprising a bundle of multiple high performance hollow fiber membranes which are permeable to said at least one gas and a tube sheet formed by a high temperature resistant cured epoxy resin that is used to fix and bound said bundle of multiple high performance hollow fiber membranes; (b) contacting the mixture on one side of said hollow fiber membrane module to cause said at least one gas to permeate said hollow fiber membranes; and (c) removing from the opposite side of said hollow fiber membrane module a permeate gas composition comprising a portion of said at least one gas which permeated said hollow fiber membranes.

The hollow fiber membrane module comprising a bundle of multiple high performance hollow fiber membranes and a tube sheet formed by a high temperature resistant cured epoxy resin that is used to fix and bound said bundle of multiple high performance hollow fiber membranes described in the present invention is especially useful in the purification, separation or adsorption of a particular species in the liquid or gas phase.

The hollow fiber membrane modules comprising a bundle of multiple high performance hollow fiber membranes and a tube sheet formed by a high temperature resistant cured epoxy resin described in the present invention is especially useful in gas separation processes in air purification, petrochemical, refinery, and natural gas industries. Examples of such separations include separation of volatile organic compounds (such as toluene, xylene, and acetone) from an atmospheric gas, such as nitrogen or oxygen and nitrogen recovery from air. Further examples of such separations are for the separation of $CO_2$ or $H_2S$ from natural gas, $H_2$ from $N_2$, $CH_4$, and Ar in ammonia purge gas streams, $H_2$ recovery in refineries, olefin/paraffin separations such as propylene/propane separation, and iso/normal paraffin separations. Any given pair or group of gases that differ in molecular size, for example nitrogen and oxygen, carbon dioxide and methane, hydrogen and methane or carbon monoxide, helium and methane, can be separated using the hollow fiber membrane modules comprising a bundle of multiple high performance hollow fiber membranes and a tube sheet formed by a high temperature resistant cured epoxy resin described in the present invention. More than two gases can be removed from a third gas. For example, some of the gas components which can be selectively removed from a raw natural gas using the hollow fiber membrane modules comprising a bundle of multiple high performance hollow fiber membranes and a tube sheet formed by a high temperature resistant cured epoxy resin described herein include carbon dioxide, oxygen, nitrogen, water vapor, hydrogen sulfide, helium, and other trace gases. Some of the gas components that can be selectively retained include hydrocarbon gases. When permeable components are acid components selected from the group consisting of carbon dioxide, hydrogen sulfide, and mixtures thereof and are removed from a hydrocarbon mixture such as natural gas, one module, or at least two in parallel service, or a series of modules may be utilized to remove the acid components. For example, when one module is utilized, the pressure of the feed gas may vary from 275 kPa to about 2.6 MPa (25 to 4000 psi). The differential pressure across the membrane can be as low as about 70 kPa or as high as 14.5 MPa (about 10 psi or as high as about 2100 psi) depending on many factors such as the particular membrane used, the flow rate of the inlet stream and the availability of a compressor to compress the permeate stream if such compression is desired. Differential pressure greater than about 14.5 MPa (2100 psi) may rupture the membrane. A differential pressure of at least 0.7 MPa (100 psi) is preferred since lower differential pressures may require more modules, more time and compression of intermediate product streams. The operating temperature of the process may vary depending upon the temperature of the feed stream and upon ambient temperature conditions. Preferably, the effective operating temperature of the hollow fiber membrane modules comprising a bundle of multiple high performance hollow fiber membranes and a tube sheet formed by a high temperature resistant cured epoxy resin of the present invention will range from about 50° to about 150° C. More preferably, the effective operating temperature of the hollow fiber membrane modules comprising a bundle of multiple high performance hollow fiber membranes and a tube sheet formed by a high temperature resistant cured epoxy resin of the present invention will range from about 100° to about 150° C.

The hollow fiber membrane modules comprising a bundle of multiple high performance hollow fiber membranes and a tube sheet formed by a high temperature resistant cured epoxy resin described in the present invention are also especially useful in gas/vapor separation processes in chemical, petrochemical, pharmaceutical and allied industries for removing organic vapors from gas streams, e.g. in off-gas treatment for recovery of volatile organic compounds to meet clean air regulations, or within process streams in production plants so that valuable compounds (e.g., vinyl-chloride monomer, propylene) may be recovered. Further examples of gas/vapor separation processes in which the hollow fiber membrane modules comprising a bundle of multiple high performance hollow fiber membranes and a tube sheet formed by a high temperature resistant cured epoxy resin described in the present invention may be used are hydrocarbon vapor separation from hydrogen in oil and gas refineries, for hydrocarbon dew pointing of natural gas (i.e. to decrease the hydrocarbon dew point to below the lowest possible export pipeline temperature so that liquid hydrocarbons do not separate in the pipeline), for control of methane number in fuel gas for gas engines and gas turbines, and for gasoline recovery.

The hollow fiber membrane modules comprising a bundle of multiple high performance hollow fiber membranes and a tube sheet formed by a high temperature resistant cured epoxy resin described in the present invention also has immediate application to concentrate olefin in a paraffin/olefin stream for olefin cracking application. For example, the hollow fiber membrane modules comprising a bundle of multiple high performance hollow fiber membranes and a tube sheet formed by a high temperature resistant cured epoxy resin described in the present invention can be used for propylene/propane separation to increase the concentration of the effluent in a catalytic dehydrogenation reaction for the production of propylene from propane and isobutylene from isobutane. Therefore, the number of stages of a propylene/propane splitter that is required to get polymer grade propylene can be reduced. Another application for the hollow fiber membrane modules comprising a bundle of multiple high performance hollow fiber membranes and a tube sheet formed by a high temperature resistant cured epoxy resin described in the present invention is for separating isoparaffin and normal paraffin in light paraffin isomerization and MaxEne™, a process for enhancing the concentration of normal paraffin (n-paraffin) in the naphtha cracker feedstock, which can be then converted to ethylene.

The hollow fiber membrane modules comprising a bundle of multiple high performance hollow fiber membranes and a tube sheet formed by a high temperature resistant cured epoxy resin described in the present invention can also be operated at high temperature to provide the sufficient dew point margin for natural gas upgrading (e.g, $CO_2$ removal from natural gas). The hollow fiber membrane modules comprising a bundle of multiple high performance hollow fiber membranes and a tube sheet formed by a high temperature resistant cured epoxy resin described in the present invention can be used in either a single stage membrane or as the first or/and second stage membrane in a two stage membrane system for natural gas upgrading.

EXAMPLES

The following examples are provided to illustrate one or more preferred embodiments of the invention, but are not limited embodiments thereof. Numerous variations can be made to the following examples that lie within the scope of the invention.

Example 1

Preparation of a Homogeneous High Temperature Resistant Epoxy Resin A

A homogeneous high temperature resistant epoxy resin A was prepared by adding 44.2 g of an aromatic epoxy represented by formula (Ia):

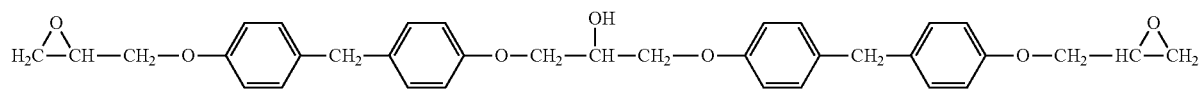

(Ia)

2.65 g of a diluent represented by formula (IIa):

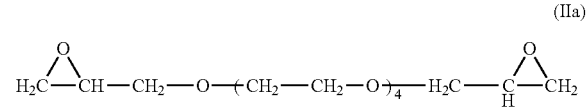

(IIa)

9.0 g of an aromatic diamine represented by formula (IV):

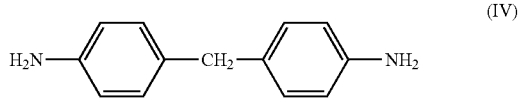 [SMILES: Nc1ccc(Cc2ccc(N)cc2)cc1]

(IV)

in a bottle and the mixture was mechanically stirred for 6 h at room temperature to form a homogeneous clear viscous liquid of high temperature resistant epoxy resin A for the preparation of tube sheet A. The viscosity of the homogeneous clear viscous liquid of high temperature resistant epoxy resin A after 6 hours of mixing is 6620 cPs measured at 25° C. and 6 rpm.

Example 2

Preparation of a Homogeneous High Temperature Resistant Epoxy Resin B

A homogeneous high temperature resistant epoxy resin B was prepared by adding 44.2 g of an aromatic epoxy represented by formula (Ia):

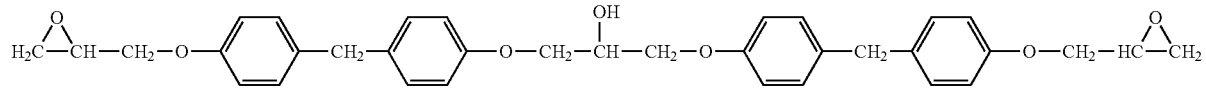
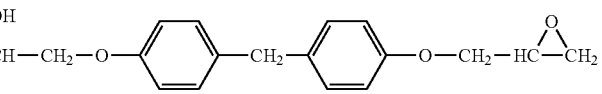

(Ia)

1.94 g of a dilutent represented by formula (IIIb):

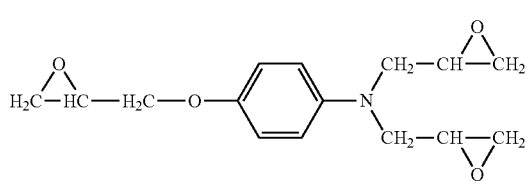

(III)

9.2 g of an aromatic diamine represented by formula (IV):

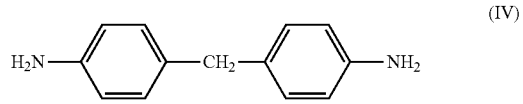 [SMILES: Nc1ccc(Cc2ccc(N)cc2)cc1]

(IV)

in a bottle and the mixture was mechanically stirred for 5 hours at room temperature to form a homogeneous clear viscous liquid of high temperature resistant epoxy resin B.

Example 3

Preparation and Hardness Study on Cured High Temperature Resistant Epoxy Resins A and B The homogeneous high temperature resistant epoxy resin A or B prepared in Example 1 and Example 2, respectively, was poured into a test specimen and was cured at 100° C. The Shore D hardness of both the cured high temperature resistant epoxy resins A and B were measured using a Mitutoyo 811-338 durometer. As shown in Table 1, both the cured high temperature resistant epoxy resins A and B showed high Shore D hardness of about 77. The cured high temperature resistant epoxy resins A and B are also stable up to 150° C.

TABLE 1

Summary of hardness measurements for cured high temperature resistant epoxy resins A and B

| Cured epoxy resin | Shore D hardness |
|---|---|
| Cured high temperature resistant epoxy resin A | 77.2 |
| Cured high temperature resistant epoxy resin B | 77.4 |

Example 4

Preparation and Tensile Strength Measurement on Cured High Temperature Resistant Epoxy Resins A and B The homogeneous high temperature resistant epoxy resin A or B prepared in Example 1 and Example 2, respectively, was poured on an aluminum plate covered with clean and smooth aluminum foil using a doctor knife with a 5-mil knife gap. The thin film of the high temperature resistant epoxy resin A or B together with the aluminum plate covered with clean and smooth aluminum foil was cured in an oven at 100° C. for 12 hours. The cured thin films of the high temperature resistant epoxy resin A and B together with the aluminum foil were cut into approximately 3 mm strips. The width and thickness of the strips were measured accurately before mounting in the Instron clamps. The sample strip was placed in the clamps with the clamps 20 mm apart. The Instron machine measured the pulling force (in Newtons) versus the distance that the clamps were pulled apart. A constant pulling rate of 2 mm/min was used for each of the tension measurements. The property of the aluminum foil was subtracted. The data in Table 2 showed that the cured high temperature resistant epoxy resin A had lower tensile strength than the cured high temperature resistant epoxy resin B. The cured high temperature resistant epoxy resin B had a tensile strength of 79 N/mm$^2$.

TABLE 2

Summary of tensile strength measurements for cured high temperature resistant epoxy resins A and B

| Cured epoxy resin | Tensile strength (N/mm$^2$) |
|---|---|
| Cured high temperature resistant epoxy resin A | 59.3 |
| Cured high temperature resistant epoxy resin B | 79.2 |

Example 5

Preparation of a Tube Sheet Formed of Cured High Temperature Resistant Epoxy Resin B The homogeneous high temperature resistant epoxy resin B prepared in Example 2 was injected into a mold containing a bundle of multiple hollow fiber membranes. The homogeneous high temperature resistant epoxy resin B together with the mold is heated at 100° C. to form the tube sheet formed of cured high temperature resistant epoxy resin B.

Specific Embodiments

While the following is described in conjunction with specific embodiments, it will be understood that this description is intended to illustrate and not limit the scope of the preceding description and the appended claims.

A first embodiment of the invention is a an epoxy resin comprising an aromatic epoxy, a diluent, and an aromatic iamine, wherein the aromatic epoxy is represented by formula (I):

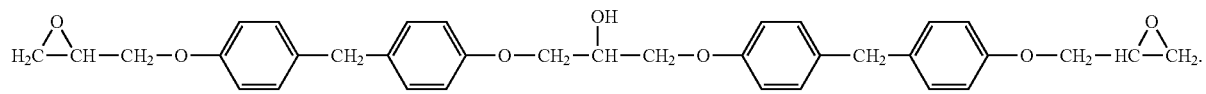

wherein n is a positive integer from 1 to 10; wherein the diluent is selected from the group consisting of an epoxy represented by formula (II), an epoxy represented by formula (III), and a mixture thereof;

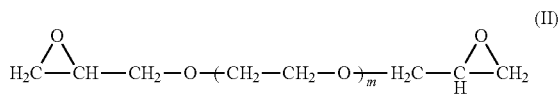

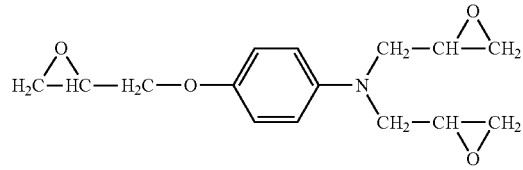

wherein m is a positive integer from 2 to 10; and wherein the aromatic diamine is represented by formula (IV):

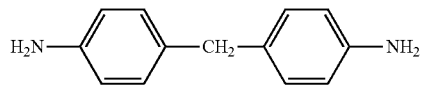

wherein the weight ratio of the aromatic epoxy to the diluent is in a range of about 10:1 to 35:1. An embodiment of the invention is one, any or all of prior embodiments in this paragraph up through the first embodiment in this paragraph wherein the weight ratio of the aromatic epoxy to the diluent is in a range of about 15:1 to 25:1. An embodiment of the invention is one, any or all of prior embodiments in this paragraph up through the first embodiment in this paragraph wherein the weight ratio of the aromatic epoxy to the aromatic diamine is in a range of about 3:1 to 15:1. An embodiment of the invention is one, any or all of prior embodiments in this paragraph up through the first embodiment in this paragraph wherein the weight ratio of the aromatic epoxy to the aromatic diamine is in a range of about 4:1 to 10:1. An embodiment of the invention is one, any or all of prior embodiments in this paragraph up through the first embodiment in this paragraph wherein wherein the aromatic epoxy is represented by a formula (Ia)

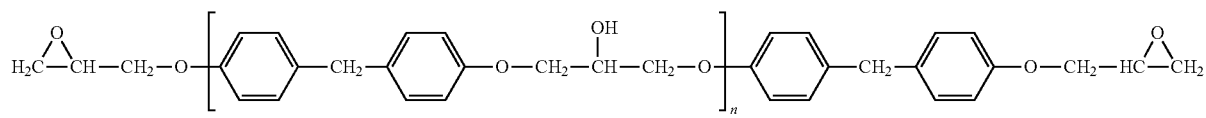

An embodiment of the invention is one, any or all of prior embodiments in this paragraph up through the first embodiment in this paragraph wherein the dilutent is represented by a formula (IIa)

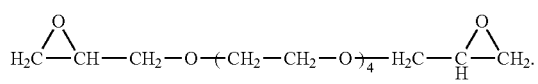

A second embodiment of the invention is a hollow fiber membrane module comprising an epoxy resin prepared from comprising an aromatic epoxy, a diluent, and an aromatic diamine, wherein the aromatic epoxy is represented by formula (I):

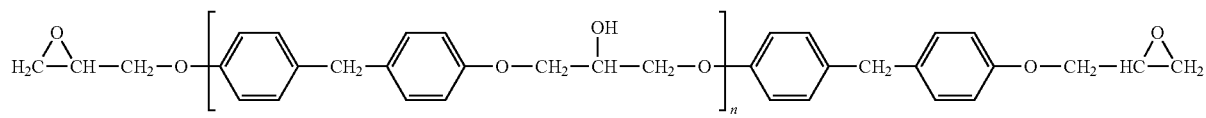

(I)

wherein n is a positive integer from 1 to 10; wherein the diluent is selected from the group consisting of an epoxy represented by formula (II), an epoxy represented by formula (III), and a mixture thereof;

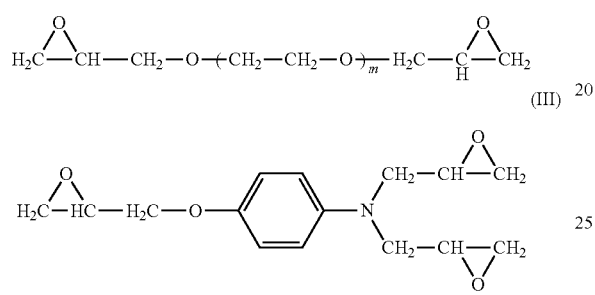

(II)

(III)

wherein m is a positive integer from 2 to 10; and wherein the aromatic diamine is represented by formula (IV):

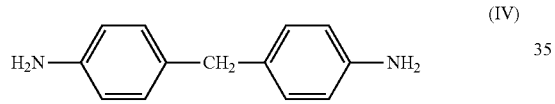

(IV)

wherein the weight ratio of the aromatic epoxy to the diluent is in a range of about 10:1 to 35:1.

A third embodiment of the invention is a process for separating at least one gas from a mixture of gases using hollow fiber membrane modules comprising a bundle of multiple high performance hollow fiber membranes and a tube sheet formed by a high temperature resistant cured epoxy resin wherein the high temperature resistant cured epoxy resin is used to fix and bound the bundle of multiple high performance hollow fiber membranes, the process comprising (a) providing the hollow fiber membrane module comprising a bundle of multiple high performance hollow fiber membranes which are permeable to the at least one gas and a tube sheet formed by the high temperature resistant cured epoxy resin comprising an aromatic epoxy, a diluent, and an aromatic diamine, wherein the aromatic epoxy is represented by formula (I):

wherein n is a positive integer from 1 to 10; wherein the diluent is selected from the group consisting of an epoxy represented by formula (II), an epoxy represented by formula (III), and a mixture thereof;

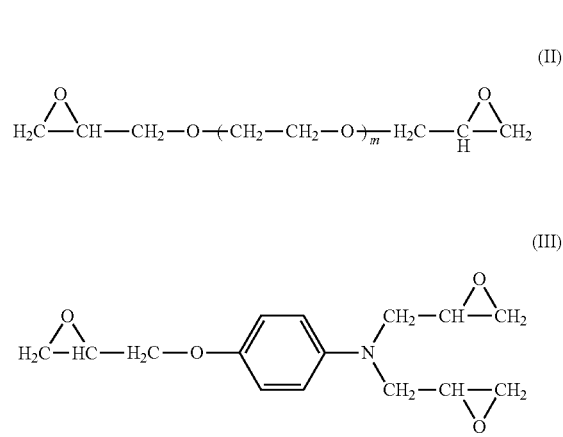

(II)

(III)

wherein m is a positive integer from 2 to 10; and wherein the aromatic diamine is represented by formula (IV)

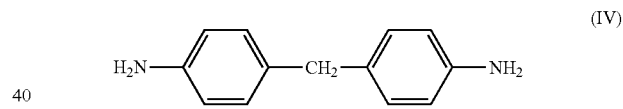

(IV)

wherein the weight ratio of the aromatic epoxy to the diluent is in a range of about 10:1 to 35:1 and that is used to fix and bound the bundle of multiple high performance hollow fiber membranes; (b) contacting the mixture on one side of the hollow fiber membrane module to cause the at least one gas to permeate the hollow fiber membranes; and (c) removing from the opposite side of the hollow fiber membrane module a permeate gas composition comprising a portion of the at least one gas which permeated the hollow fiber membranes. An embodiment of the invention is one, any or all of prior embodiments in this paragraph up through the third embodiment in this paragraph wherein the aromatic epoxy is represented by a formula (Ia)

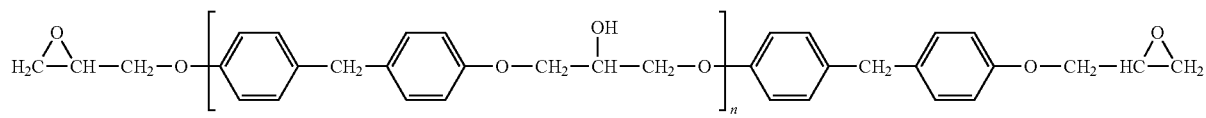

(I)

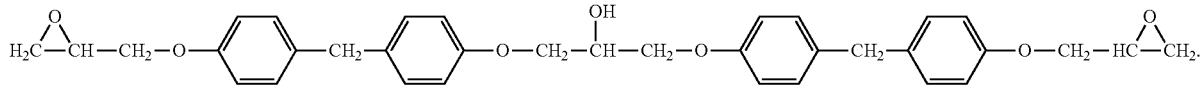

(Ia)

An embodiment of the invention is one, any or all of prior embodiments in this paragraph up through the third embodiment in this paragraph wherien the dilutent is represented by a formula (IIa)

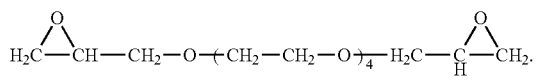

(IIa)

An embodiment of the invention is one, any or all of prior embodiments in this paragraph up through the third embodiment in this paragraph wherein the mixture of gases comprises carbon dioxide or hydrogen sulfide in natural gas. An embodiment of the invention is one, any or all of prior embodiments in this paragraph up through the third embodiment in this paragraph wherein the mixture of gases comprises at least one volatile organic gas in air. An embodiment of the invention is one, any or all of prior embodiments in this paragraph up through the third embodiment in this paragraph wherein the mixture of gases comprises hydrogen, nitrogen, methane and argon in ammonia purge gas streams. An embodiment of the invention is one, any or all of prior embodiments in this paragraph up through the third embodiment in this paragraph wherein the mixture of gases comprises hydrogen in gases from a refinery. An embodiment of the invention is one, any or all of prior embodiments in this paragraph up through the third embodiment in this paragraph wherein the mixture of gases comprises a mixture of olefins and paraffins or iso paraffins and normal paraffins. An embodiment of the invention is one, any or all of prior embodiments in this paragraph up through the third embodiment in this paragraph wherein the mixture of gases comprises a mixture of a at least two gases selected from the group consisting of nitrogen and oxygen, carbon dioxide and methane, hydrogen and methane or carbon monoxide, or helium and methane. An embodiment of the invention is one, any or all of prior embodiments in this paragraph up through the third embodiment in this paragraph wherein the mixture of gases comprises at least two gases selected from the group consisting of carbon dioxide, oxygen, nitrogen, water vapor, hydrogen sulfide, helium, and other trace gases.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. An epoxy resin comprising an aromatic epoxy, a diluent, and an aromatic diamine, wherein said aromatic epoxy is represented by formula (I):

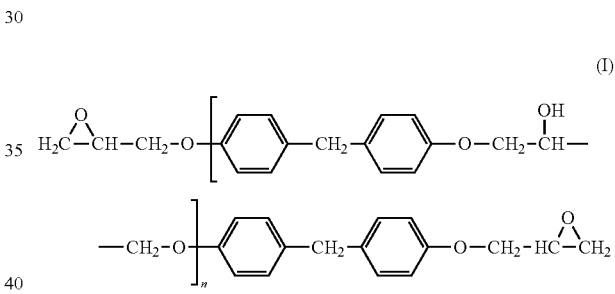

wherein n is a positive integer from 1 to 10;

wherein said diluent is selected from the group consisting of an epoxy represented by formula (II), an epoxy represented by formula (III), and a mixture thereof;

(II)

$H_2C\overset{O}{-}CH-CH_2-O-(CH_2-CH_2-O)_{\overline{m}}H_2C-\underset{H}{\overset{O}{C}}-CH_2$ (III)

wherein m is a positive integer from 2 to 10; and wherein said aromatic diamine is represented by formula (IV):

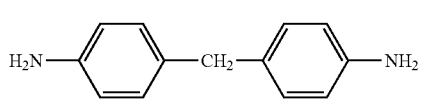
(IV)

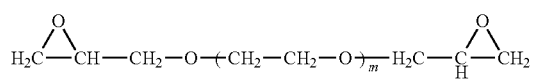
(II)

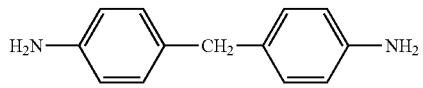
(III)

wherein the weight ratio of said aromatic epoxy to said diluent is in a range of about 10:1 to 35:1.

2. The epoxy resin of claim 1 wherein the weight ratio of said aromatic epoxy to said diuent is in a range of about 15:1 to 25:1.

3. The epoxy resin of claim 1 wherein the weight ratio of said aromatic epoxy to said aromatic diamine is in a range of about 3:1 to 15:1.

4. The epoxy resin of claim 1 wherein the weight ratio of said aromatic epoxy to said aromatic diamine is in a range of about 4:1 to 10:1.

5. The epoxy resin of claim 1 wherein said aromatic epoxy is represented by a formula (Ia):

wherein m is a positive integer from 2 to 10; and
wherein said aromatic diamine is represented by formula (IV):

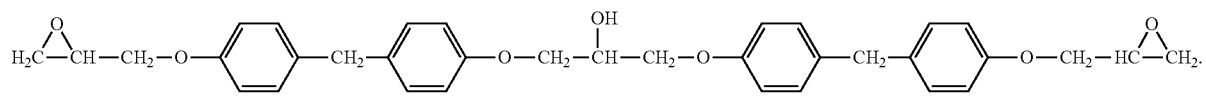
(Ia)

6. The epoxy resin of claim 1 wherien said dilutent is represented by a formula (IIa):

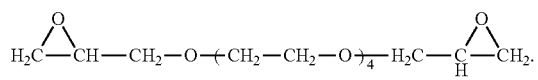
(IIa)

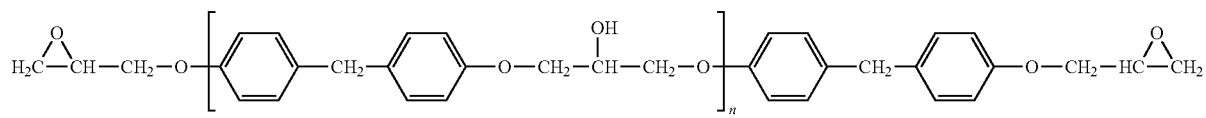
(IV)

wherein the weight ratio of said aromatic epoxy to said diluent is in a range of about 10:1 to 35:1.

8. A process for separating at least one gas from a mixture of gases using hollow fiber membrane modules comprising a bundle of multiple high performance hollow fiber membranes and a tube sheet formed by a high temperature resistant cured epoxy resin wherein said high temperature resistant cured epoxy resin is used to fix and bound said bundle of multiple high performance hollow fiber membranes, the process comprising:

(a) providing the hollow fiber membrane module comprising a bundle of multiple high performance hollow 7. A hollow fiber membrane module comprising an epoxy resin prepared from comprising an aromatic epoxy, a diluent, and an aromatic diamine, wherein said aromatic epoxy is represented by formula (I):

(I)

wherein n is a positive integer from 1 to 10;

wherein said diluent is selected from the group consisting of an epoxy represented by formula (II), an epoxy represented by formula (III), and a mixture thereof;

fiber membranes which are permeable to said at least one gas and a tube sheet formed by the high temperature resistant cured epoxy resin comprising an aromatic epoxy, a diluent, and an aromatic diamine, wherein said aromatic epoxy is represented by formula (I):

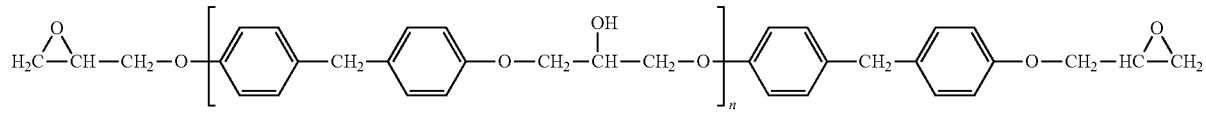

wherein n is a positive integer from 1 to 10;

wherein said diluent is selected from the group consisting of an epoxy represented by formula (II), an epoxy represented by formula (III), and a mixture thereof;

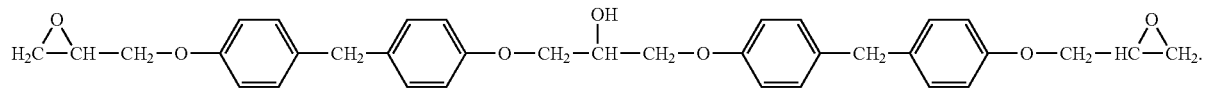

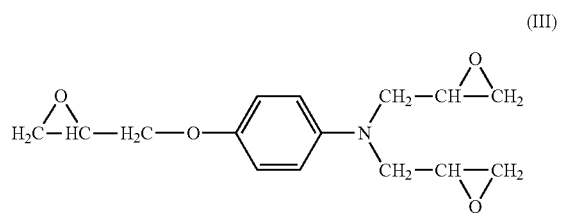

wherein m is a positive integer from 2 to 10; and
wherein said aromatic diamine is represented by formula (IV):

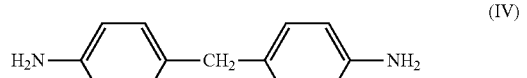

wherein the weight ratio of said aromatic epoxy to said diluent is in a range of about 10:1 to 35:1 and that is used to fix and bound said bundle of multiple high performance hollow fiber membranes;

(b) contacting the mixture on one side of said hollow fiber membrane module to cause said at least one gas to permeate said hollow fiber membranes; and (c) removing from the opposite side of said hollow fiber membrane module a permeate gas composition comprising a portion of said at least one gas which permeated said hollow fiber membranes.

9. The process of claim 8 wherein said aromatic epoxy is represented by a formula (Ia):

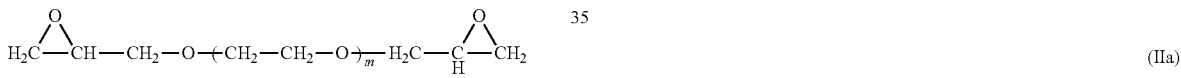

10. The process of claim 8 wherien said dilutent is represented by a formula (IIa):

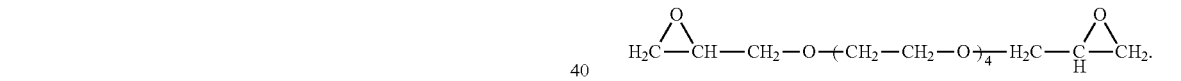

11. The process of claim 8 wherein said mixture of gases comprises carbon dioxide or hydrogen sulfide in natural gas.

12. The process of claim 8 wherein said mixture of gases comprises at least one volatile organic gas in air.

13. The process of claim 8 wherein said mixture of gases comprises hydrogen, nitrogen, methane and argon in ammonia purge gas streams.

14. The process of claim 8 wherein said mixture of gases comprises hydrogen in gases from a refinery.

15. The process of claim 8 wherein said mixture of gases comprises a mixture of olefins and paraffins or iso paraffins and normal paraffins.

16. The process of claim 8 wherein said mixture of gases comprises a mixture of a at least two gases selected from the group consisting of nitrogen and oxygen, carbon dioxide and methane, hydrogen and methane or carbon monoxide, or helium and methane.

17. The process of claim 8 wherein the mixture of gases comprises at least two gases selected from the group consisting of carbon dioxide, oxygen, nitrogen, water vapor, hydrogen sulfide, helium, and other trace gases.

* * * * *